United States Patent [19]
Wagner

[11] Patent Number: 5,598,439
[45] Date of Patent: Jan. 28, 1997

[54] METHOD AND APPARATUS FOR SYMBOL CLOCK PHASE RECOVERY

[75] Inventor: Douglas R. Wagner, Monroe, Wash.

[73] Assignee: Hewlett-Packard Company, Palo Alto, Calif.

[21] Appl. No.: 242,484

[22] Filed: May 13, 1994

[51] Int. Cl.⁶ .................................................. H04L 27/14
[52] U.S. Cl. ............................................. 375/326; 375/355
[58] Field of Search ...................................... 374/223, 226, 374/322, 326, 329, 334, 355; 329/304, 341, 345

[56] References Cited

U.S. PATENT DOCUMENTS

| | | | |
|---|---|---|---|
| 4,453,259 | 6/1984 | Miller | 375/355 |
| 4,675,881 | 6/1987 | Chung | 375/78 |
| 5,001,724 | 3/1991 | Birgenheier et al. | 375/10 |
| 5,073,904 | 12/1991 | Nakamura et al. | 375/94 |
| 5,103,465 | 4/1992 | Crisler et al. | 375/110 |
| 5,144,642 | 9/1992 | Weinberg et al. | 375/228 |
| 5,187,719 | 2/1993 | Birgenheier et al. | 375/10 |
| 5,278,865 | 1/1994 | Amrany et al. | 375/222 |

FOREIGN PATENT DOCUMENTS

| | | |
|---|---|---|
| 0105513 | 4/1984 | European Pat. Off. . |
| 0324581 | 7/1989 | European Pat. Off. . |

OTHER PUBLICATIONS

Ahmad, J.; Jeans, T.G.; Evan, B. G. "DSP Implementation of Preambleless all Digital OOPSK Demodulator For Maritime and Mobile Data Communications", Conference Title: IEEE Coloquium on DSP Application in Communication Systems (Digest No. 64), Publisher IEEE, London, UK, 22 Mar. 1993.

Primary Examiner—Stephen Chin
Assistant Examiner—Don Vo
Attorney, Agent, or Firm—Bloor Redding, Jr.

[57] ABSTRACT

A method and apparatus for recovering the phase of a symbol clock operating at a predetermined symbol rate is described. A modulated RF signal which has been down-converted or a modulated baseband signal is filtered and sampled by a high speed converter. A high speed digital signal processor processes the digitized signal to determine the phase of the symbol clock. The symbol phase is determined independent of carrier phase by repetitively resampling the digitized signal and constructing the histogram for each resample of that signal. By comparing the histograms of each resample the symbol phase may be identified. Using the symbol rate and phase, the signal may be analyzed for carrier phase and frequency errors and modulation accuracy using eye diagrams, modulation trajectories and symbol content.

20 Claims, 11 Drawing Sheets

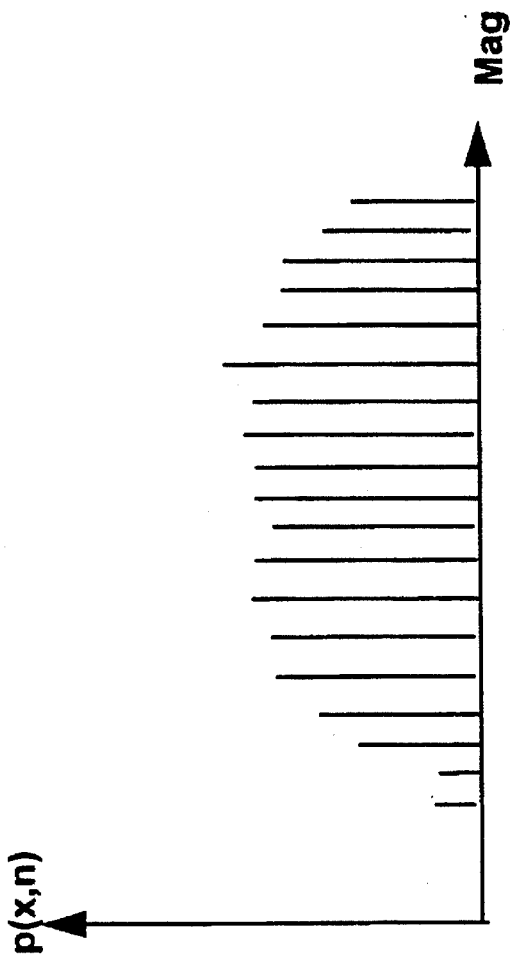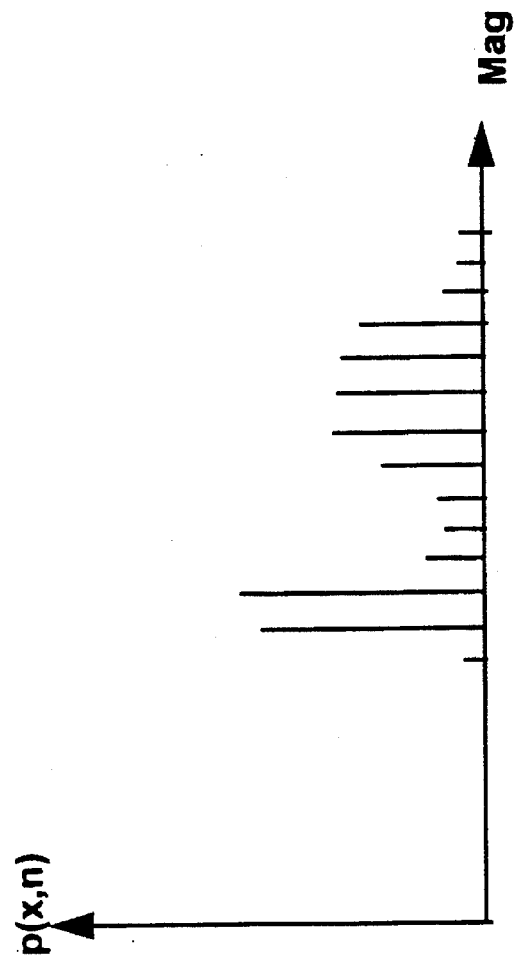

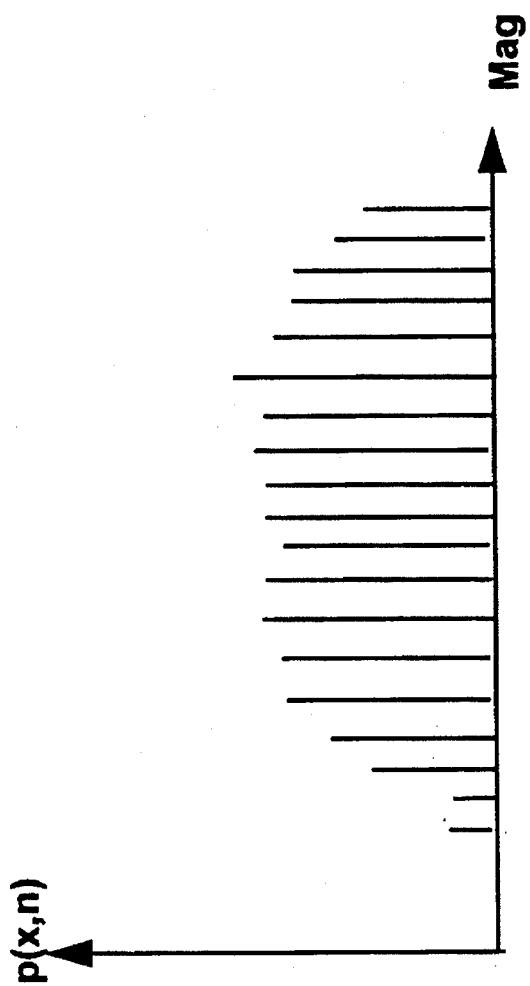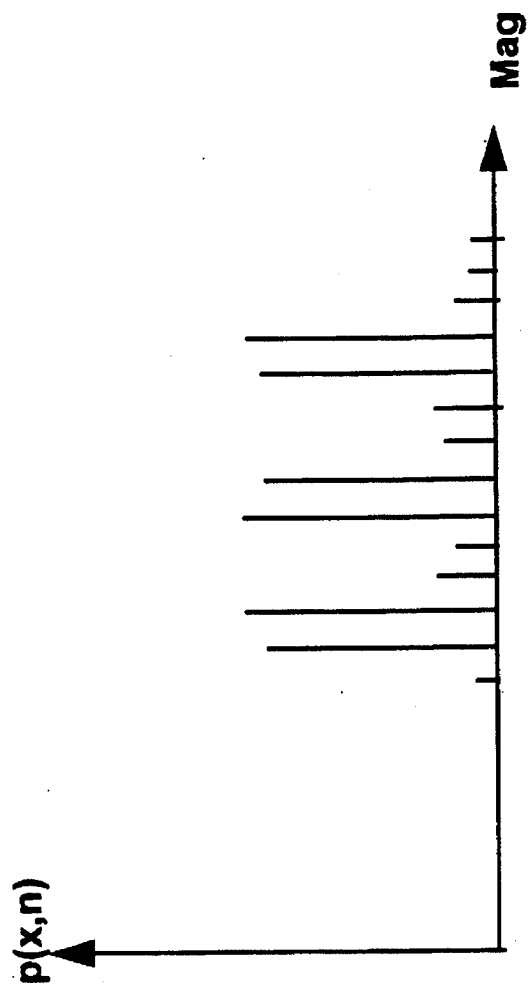

METHOD AND APPARATUS FOR SYMBOL CLOCK PHASE RECOVERY

BACKGROUND

1. Field of the Invention

The present invention relates generally to communication systems which use digital modulation techniques, such as QAM, QPSK and OQPSK, and more specifically to instrumentation for measuring and troubleshooting modulation problems and errors.

2. Description of Related Art

There is presently a shift in modern communication systems from analog modulation methods to digital modulation methods. This is driven by the ever-increasing need to drive more information through narrower channels of the RF spectrum and for computers to communicate between themselves. While the design of each communication system is driven by its own particular needs, there have developed a general set of digital modulation schemes including, M-ary PSK modulation schemes and M-try quadrature amplitude modulation (QAM) schemes. Such methods include, among others, quadrature phase shift keying (QPSK), offset quadrature phase shift keying (OQPSK).

The bandwidth efficiency of these systems may be maximized using a group of theorems developed by Nyquist, including the Nyquist Minimum-Bandwidth Theorem and the Nyquist Intersymbol Interference and Jitter Free Transmission Theorem. The theorems describe a method of spreading the energy of one symbol over the period of time used to transmit several symbols without creating intersymbol interference. These theorems may be implemented using a system of filters which are generally referred to as Nyquist filters. Nyquist filters generate considerable distortion except in the regions in the immediate neighborhood of the "sampling instants" or "null points" determined by a symbol clock. If the symbol clock is known, including both its rate and phase, then the symbol clock may be used to recover the binary signal and to drive a display to generate eye diagrams and constellation diagrams. The size of the eye in the eye diagram and the stability of the constellation diagram are useful measures of the communication system operating margins. Unstable eye patterns and constellation diagrams may be used to diagnose modulation or other system problems, such as unstable carriers.

Digital demodulators for M-ary PSK modulated signals must use coherent detection. Coherent detectors require an exact replica of the carrier, in both frequency and phase. Any errors in this carrier replica, either in frequency or phase, can cause significant errors in the later stages of the receiver. Coherent detection of digitally modulated signals is subject to a well known carrier phase ambiguity. This may be most easily demonstrated by considering the constellation for a particular modulation scheme. If the constellation is rotated by phase errors between the actual carrier and the replica carrier, for certain angles of rotation, there is no way that the demodulator in the receiver can distinguish the rotated constellation from a valid constellation without some knowledge of the data. These ambiguities may be overcome by additional information from the data itself, for example, a short preamble, or through differential coding. Certain modulation schemes have an inherent symbol phase ambiguity, for example, OQPSK. For OQPSK, there are two clock transitions, an I transition and a Q transition, causing symbol phase uncertainty. Symbol phase ambiguities are additive with the carrier phase ambiguities complicating demodulation. When coherent demodulators are used to demodulate these signals, additional information from the data itself or differential coding must be used to remove the ambiguity.

Since in most systems the receiver timing is independent of transmitter timing, the carrier frequency and phase must be derived from the transmitted signal. Generally, the replica carrier is generated using a narrow band phase-locked loop. Two general approaches exist to provide a phase reference to "lock" this loop, conventional approaches and data directed approaches. Conventional approaches, for example, frequency doubling, frequency quadrupling and Costas loops, multiply the transmitted signal in order to generate a coherent phase reference. Data directed demodulators derive symbol timing information from the signal and use that information to generate a coherent phase reference. Conventional approaches require a long data transmission to generate the coherent phase reference. In modern digital communication systems, short bursts are increasingly being used. These burst are often too short for conventional approaches to "lock". The data directed approaches can obtain the required phase information more quickly and therefore will "lock" more quickly. Therefore, data directed approaches are also better suited for test equipment.

Existing data directed approaches have relied on the existence of a spectral component or "spectral lines" in the modulated signal or on a unique segment or "preamble" in the modulated signal to acquire the needed symbol timing information. However, modulation schemes and some system situations are incompatible with these approaches. Staggered M-ary PSK modulated signals do not have a useable spectral line component, because it is very weak. Many modulated signals do not have long preambles. Finally, any distortion and noise in the transmission system can sometimes cause problems detecting the spectral information. Therefore, there exists a need for a more robust technique for acquiring the required symbol timing information for data directed demodulators.

SUMMARY OF THE INVENTION

An important advantage of the present invention is the ability to demodulate digitally modulated signals in communication systems which communicate in short bursts.

Another important advantage of the present invention is the ability to demodulate digitally modulated signals in communication systems whose modulation schemes do not use preambles. Similarly, another advantage of the present invention is the ability to demodulate modulated signals without reference to long preambles in communication systems whose modulation schemes use preambles.

Another important advantage of the present invention is the ability to demodulate digitally modulated signals which do not have readily identifiable spectral components which are a function of the symbol rate.

Another further advantage of the present invention is its tolerance of intersymbol interference and, particularly, distortion.

A method for determining the symbol clock phase of a modulated signal, having a predetermined symbol period is disclosed. This method begins by sampling the modulated signal using a fixed rate converter. In the next step, the sampled signal is repetitively resampled beginning at a plurality of predetermined start times and having a predetermined resample period. The step of repetitively resampling generates a plurality of resample time records. Each resample time record has its respective start time. In the next step, a statistical operation is performed on each resampled time record of the plurality of resample time records to generate statistical information about each resampled time record. This information, together with the respective start time of the resampled time record on which the statistical operation was performed, forms a plurality of statistical property records. The final step in the method is evaluating these statistical property records to select the record with the statistical information which most closely matches a theoretical set of statistical properties. The start time of this selected magnitude time record is approximately 0° of the symbol clock.

DESCRIPTION OF THE DRAWINGS

FIGS. 8A and 8B are plots of the histogram of a typical narrow bandwidth Nyquist filtered OQPSK magnitude time records.

FIG. 10A and 10B are plots of the histogram of a typical 16 QAM magnitude time records.

DESCRIPTION OF THE PREFERRED EMBODIMENT

1. Structure of the Preferred Embodiment

Figure 1:
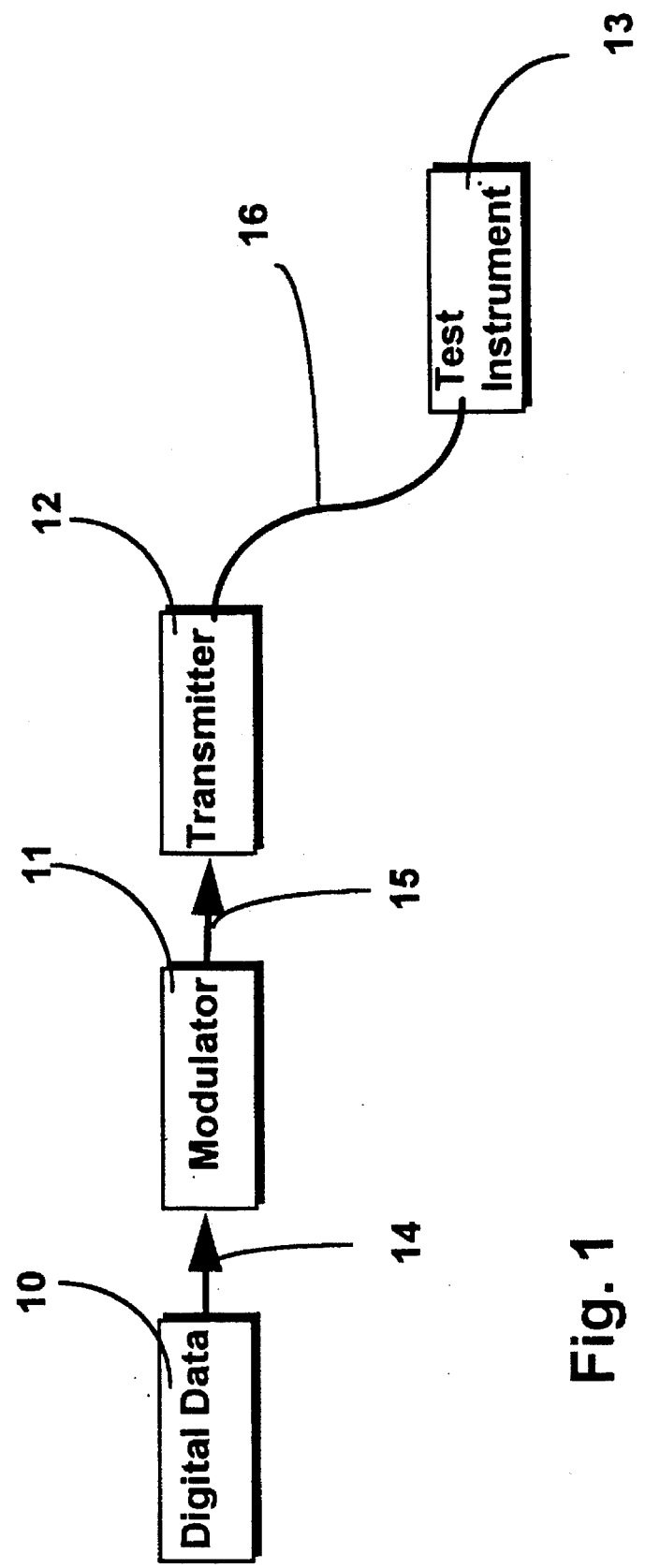
FIG. 1 is a block diagram of a typical test setup for a communication system using test equipment in accordance with the present invention.

FIG. 1 is a block diagram of a typical test setup for a communications system using test equipment employing the present invention. Digital data 14 at serial bit rate, $f_n$, is fed from digital data source 10 into modulator 11. The modulator 11 may use any digital modulation scheme including an M-ary PSK modulation scheme or M-ary QAM modulation scheme. In addition, the modulator may be differentially coded. The modulation scheme will generally encode the digital data into M spaced frequencies (or phase/amplitude states) for each symbol period, T. The symbol rate, $f_s$, where $f_s = 1/T$ is given by the equation:

$$f_S = \frac{f_N}{M}$$

For any communication system under analysis at a particular point of time, the modulation scheme and data rate will be fixed, and therefore the symbol rate, fs, and symbol period, T, will also be fixed.

After the data has been modulated, the modulated signal 15 is fed to a transmitter 12. Transmitter 12 translates the modulated signal 15 to the appropriate frequency generally by mixing it with a carrier. However, the method and apparatus of the present invention are equally applicable to spread spectrum types of communication systems.

In FIG. 1, the signal 16 from the transmitter is fed to test equipment 13. Test equipment 13 is equally capable of analyzing the modulated signal 15. The tests performed by test equipment 13 include, but are not limited to, error measurements, eye diagrams, modulation constellation diagrams, and performance measures. Error measurements include detecting and measuring errors caused by the modulator 11, typically phase and amplitude errors, and errors caused by the transmitter 12, typically errors in carrier frequency and phase.

Figure 2:
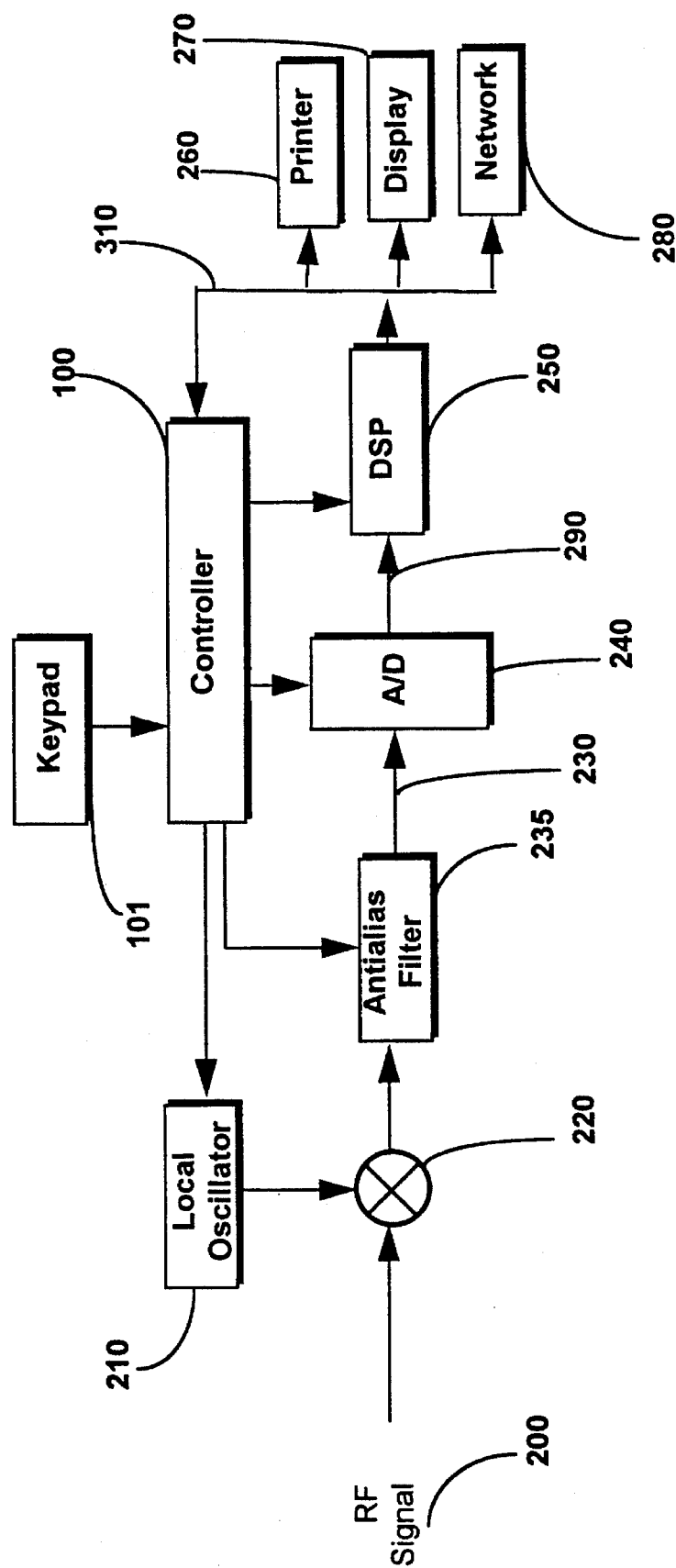
FIG. 2 is a conceptual block diagram of test equipment in accordance with the present invention.

FIG. 2 is a conceptual block diagram of test equipment in accordance with the present invention. The test equipment may have one or more frequency translation stages before RF signal 200 is generated. The RF signal 200 is fed to a conventional mixer 220. The mixer 220, driven by local oscillator 210, translates the signal 200 to a frequency suitable for analog to digital converter 240. The test equipment in accordance with the invention may also accept baseband signals from the IF sections of both transmitters and receivers fed directly to the antialias filter 235. The translated signal is first passed through antialias filter 235, which has been appropriately chosen based on the sample rate of the converter 240. Then, the filtered signal 230 is the sampled at sample rate $f_d$ and quantized by the converter 240. In the preferred embodiment of the present invention, the converter has a sample rate, $f_d$, equal to 25.6 MHz with 16 bit linearity. Each sample is represented by a floating point number.

After the signal has been digitized, the digitized signal 290 is fed to a digital signal processor 250 for demodulation and analysis. The results of the demodulation and analysis are displayed on one or more of printer 260 and display 270. Results may also be made available through network connection 280.

Controller 100 controls the operation of the test equipment. The controller 100 can adjust the test equipment for different modulation schemes and different symbol and carrier frequencies. The controller 100 receives user input from keypad 101.

In general, equipment in accordance with the present invention may operate in a block mode or a continuous mode. In either mode, the digitized signal is stored in an array. These arrays are commonly referred to as time records 290. In block mode, the digitized signal is stored in the time record and then analyzed by the test equipment accordingly. After the signal has been analyzed, the time record is once again filled with the digitized signal and the process is repeated. In a continuous mode, the digitized signal is also loaded into a time record. However, while the data in one time record is being analyzed, additional data is being loaded into another time record. The preferred embodiment of the present invention operates in block mode and with a time record 290 of up to 4096 samples. Other sampling rates, converter accuracy, and time record sizes could be chosen based on the cost of the equipment and the accuracy of the measurements to be made.

Figure 3:
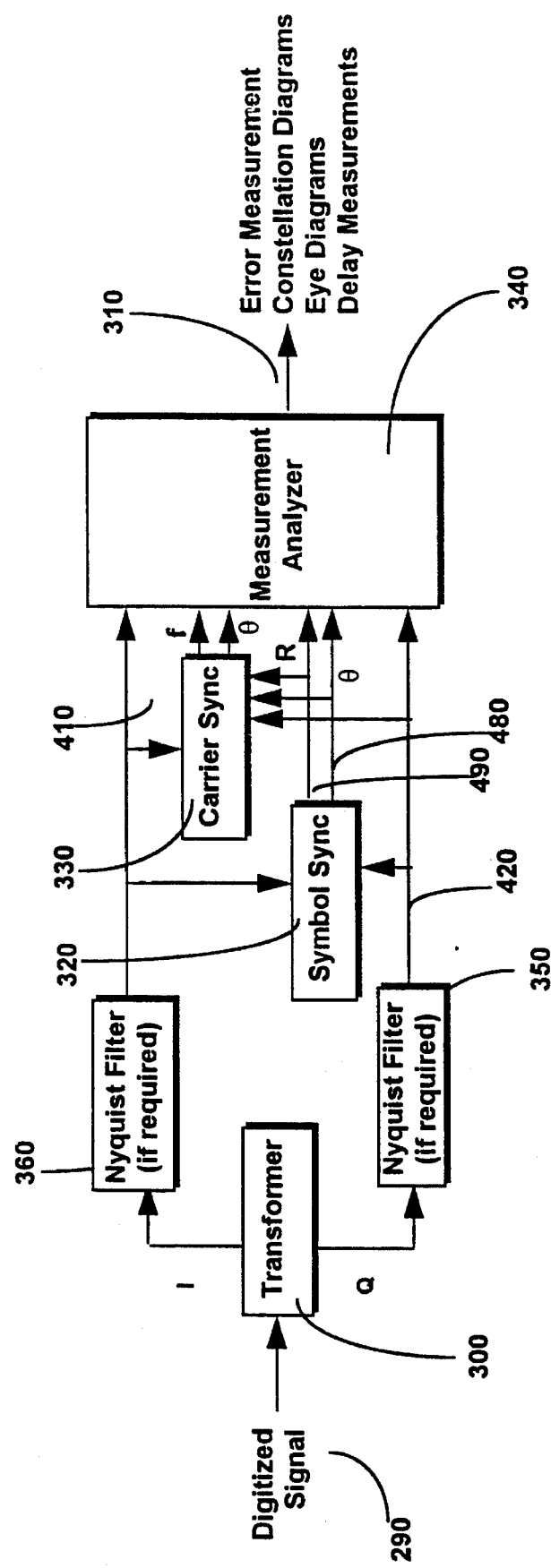
FIG. 3 is a conceptual block diagram of a digital signal processor of FIG. 2 in accordance with the present invention.

FIG. 3 is a conceptual block diagram of the operation of the digital signal processor 250 operating as a demodulator in accordance with the present invention. The time record 290 is fed to transformer 300 which separates the digitized signal into its real and imaginary parts. Transformers are well known in the art. The real part of the time record 290 is loaded into I time record 410 and imaginary part is loaded into Q time record 420.

As stated above, the bandwidth of the modulated signal is significantly band limited by the Nyquist filter. In some modulation schemes, the Nyquist filtering occurs before transmission. In other modulation schemes, some filtering is performed before transmission and the remainder after transmission. In those system where the remainder is performed after transmission, the receiver, or, here, the test equipment, must perform the remainder of the filtering. If filtering is required, it is may be performed in the preferred embodiment of the present invention by passing the I time record 410 and the Q time record 420 through the appropriate optional Nyquist filters 350 and 360.

After any required Nyquist filtering, both the I time record 410 and the Q time record 420 are fed to the symbol synchronizer 320. The symbol synchronizer 320, using symbol rate 490, determines the symbol phase 480. The I time record 410, Q time record 420, symbol rate 490 and symbol phase 480 are fed to carrier synchronizer 330. The carrier synchronizer 330 extracts the carrier frequency and carrier phase required for coherent detection. The I time record 410, Q time record 420, symbol rate 490, symbol phase 480, and the carrier frequency and phase are fed to measurement analyzer 340. The measurement analyzer 340 using well known techniques analyzes the signal for modulation errors and transmitter errors. The Nyquist filters 360 and 370, symbol synchronizer 320, carrier synchronizer 330 and measurement analyzer 340 are all under the control of controller 100.

The measurement analyzer 340 can perform analysis of the digitized signal using, for example, an FFT to measure harmonic content. The measurement analyzer 340 can also measure modulation accuracy as described in U.S. Pat. 5,187,719 entitled METHOD AND APPARATUS FOR MEASURING MODULATION ACCURACY. The measurement analyzer and controller can also display eye diagrams and constellation diagrams on the display 270.

Figure 4:
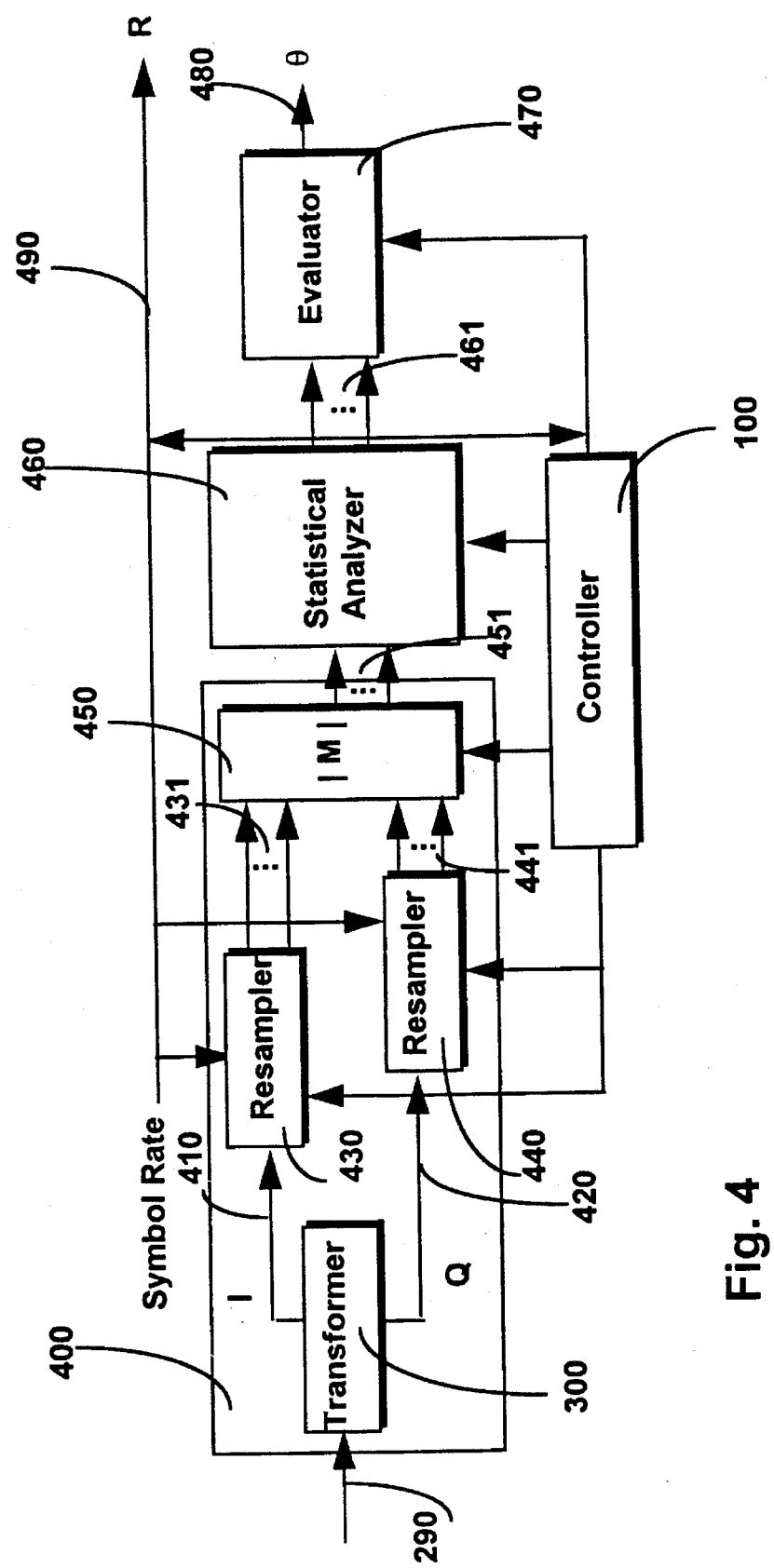
FIG. 4 is a conceptual block diagram of the symbol synchronizer of FIG. 3 in accordance with the present invention.

FIG. 4 is a conceptual block diagram of the symbol synchronizer 320 in accordance with the present invention. The symbol synchronizer comprises an I resampler 430 and a Q resampler 440, magnitude generator 450, statistical analyzer 460 and evaluator 470. Each of these components is under the control of controller 100.

The resamplers 430 and 440 are used to repetitively resample the signal 230 at predetermined times. These resample times are generally not related to the original sample times. The resample times are a function of an initial sample time and a resample rate. The output of resampler 430 is a set of resampled I time records 431. The output of resampler 440 is a set of resampled Q time records 441. Each time record in the set has a different initial sample start time, but each pair of resampled I and Q time records has the same initial sample start time. The initial sample start times and resample rates are described further below.

The sets of resampled I and Q time records are fed to magnitude generator 450. The magnitude generator may also be known as a "magger". The magger 450 calculates the jth magnitude of the magnitude time record (M) from the jth pair of resampled I and Q time records using the formula:

$$M_j = \sqrt{I_j^2 + Q_j^2}$$

The process is repeated for the each sample in the time record and each time record in the set of resampled time records. The output of the magger 450 is a set of magnitude time records 451. In addition, the magger may normalize the magnitudes in each time record to a predetermined range of values. Such normalization may be based on the peak magnitude in the magnitude time record, or it may be based on other statistical property, such as a mean, of the magnitude time record.

Since the magnitude time record is equivalent to the amplitude time record of the signal at the new resample time, the function of transformer 300, resampler 430 and 440 and magger 450 may be viewed as in an alternate embodiment as resampler 400, a resampler which resamples time record 290 to generate a set of magnitude time records 451.

The set of magnitude time records 451 is fed to statistical analyzer 460 which performs one or more statistical operations on each magnitude time record 451 in the set. In the preferred embodiment of the present invention, the statistical analyzer calculates the histogram (probability density function) and then determines the peak values and variances of that histogram for each magnitude time record in the set of magnitude time records 451. The output of the statistical analyzer 460 is a set of statistical property records 461.

A histogram or probability density function may be generated for any modulated signal using the schemes described above. After the modulated signal has been band limited as set forth in the Nyquist Theorem, its probability density function will be severely distorted. However, if, rather than continuously sampling the signal or randomly sampling the signal, the signal is sampled in phase with the symbol clock, the probability density function should approach the theoretical value. Although any intersymbol interference, channel distortion, or noise will serve to spread out the probability density function, the probability density function may be used in accordance with the preferred embodiment of the present invention to determine the phase of the symbol clock. For example, the histogram for a non-staggered M-ary PSK modulated signal will approximate an impulse at magnitude equals 1 and 0 elsewhere and, for a 16 QAM signal, it will approximate three impulses at magnitudes 1, 0.85 and 0.33 (for magnitudes normalized to 1). The histogram for any modulation scheme may be easily simulated.

The evaluator 470 receives the set of statistical property records 461 from the statistical analyzer 460 and from that set selects the statistical property record which matches most closely the theoretical histogram (probability density function). The initial sample start time associated with this statistical property record is the best estimate of the phase of the symbol clock. The preferred embodiment of the present invention is capable of locking the phase of the symbol clock with as few as 20 symbols. This process may be repeated, if necessary, until a phase estimate of suitable accuracy and resolution is obtained.

2. Operation of the Preferred Embodiment

FIG. 4 operates according to the following methods. First, the symbol rate must be determined. In the preferred embodiment of the present invention, an operator enters the symbol rate into keypad 110. The symbol rate is generally fixed for a communication system and is usually controlled by a crystal clock, so the information is easily and accurately obtained. The symbol rate could be determined by observing other properties of the modulated signal, if desired.

Next, a set of magnitude time records of the filtered signal 230 is generated. Each magnitude time record in the set has the same sample rate, but a different initial sample start time, $D_t$. In most cases, this set of magnitude time records is most easily generated by sampling the filtered signal 230 once to create an original time record and then resampling this original time record for each required magnitude time record. Since in the preferred embodiment of the present invention, the digitized signal is already available in the form of I and Q time records, the I and Q time records are repetitively resampled and then fed to a magger to generate the set of magnitude time records.

Each magnitude time record is sampled at the same resample rate. This resample rate in the preferred embodiment of the present invention is a function of the modulation scheme. For non-staggered M-ary PSK modulated signals, the resample rate is the symbol rate, $f_s$. For staggered M-try PSK modulated signals, the resample rate is twice the symbol rate, $2f_s$. For QAM modulated signals, the resample rate is also the symbol rate, $f_s$.

Each magnitude time record in the set has a different initial sample start time. For signals where no estimate of the phase of the symbol clock is available, a first embodiment of the resampler 430 and 440 is used. For signals where an estimate of the phase of the symbol clock is available, a second embodiment of the resampler 430 and 440 is used.

Figure 5:
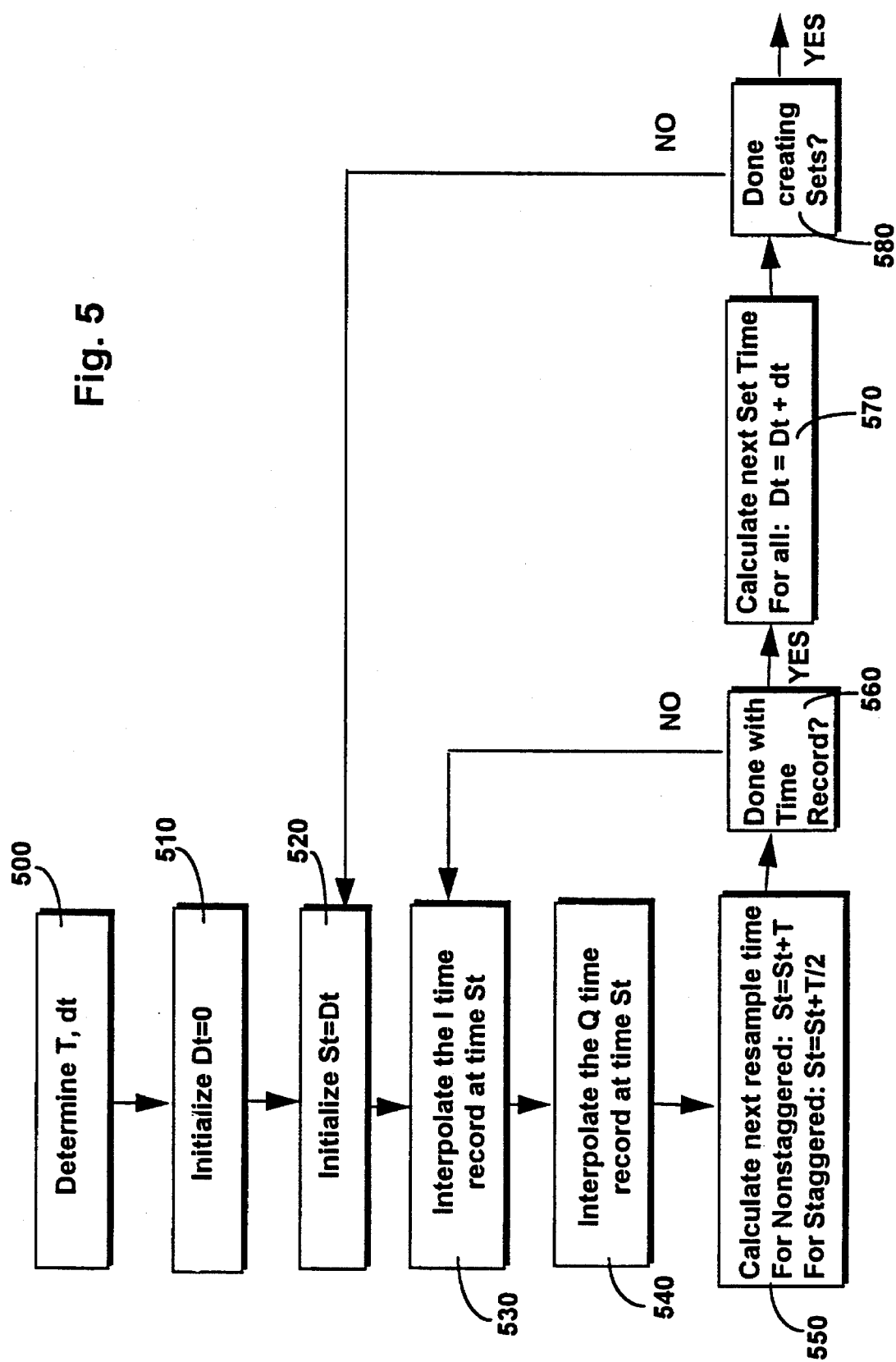
FIG. 5 is a flow chart of the method used in the first embodiment of the resampler of FIG. 4 in accordance with the present invention.

FIG. 5 is a flow chart of the method used in the first embodiment of the resampler in accordance with the present invention. Since the phase is not known, the strategy used in the first embodiment is to search for the 0° phase through one period, $2\pi$, of the symbol clock by spreading the initial sample start times uniformly over that period. For modulation schemes where there is an inherent symbol phase ambiguity, such as OQPSK, the search is performed over a period equal to this ambiguity, since searching beyond this ambiguity is inefficient. For OQPSK, this search is over $\pi$, rather than $2\pi$, and the resulting ambiguity is resolved later using information from the data itself. In step 500, the values for T and dt are determined. The resample period, T, is defined as $T=1/f_s$, where $f_s$ is the known symbol rate. The required resolution for the phase measurement is used to determine the variable dt. Generally, for a desired resolution R (in radians) the number of resampled time records, k, is given for non-staggered M-ary PSK and QAM by the equation $k=2\pi/R$ and for staggered M-ary PSK by the equation $k=\pi/R$. Then dt is given by the equation $dt=T/k$ for non-staggered M-ary PSK and QAM and by the equation $dt=T/2k$ for staggered M-ary PSK.

The first embodiment of the resampler generates a set of k resample records 431 (or 432) for each time record 410 (or 420). Each resample record 431 (or 432) will have one sample per symbol in the time record 410 (or 420). For burst mode digital communication systems, the time record 410 in the preferred embodiment of the present invention is capable of gathering between 60 and 100 symbols. For continuous mode digital communication systems, the number of symbol samples, j, in each resample record is a function of the sample rate of the converter 240 and the size of the time record.

In step 510, the variable $D_t$ is initialized to 0. The first sample in either the I or Q time record 410 or 420 is defined to be at time equals 0. Variable $D_t$ is the initial sample start time which is uniquely calculated for each resample time record generated in the set. It is also used to determine when resampling has been completed. The variable $S_t$, is the resample time for each sample. In step 520, it is then initialized to $D_t$, the first resample time for this time record.

In step 530, the I time record is interpolated at time equals $S_t$. Interpolation may be performed using any number of different techniques including linear interpolation and frequency responsive interpolation. Frequency responsive interpolation is described in U.S. Pat. No. 5,235,534, entitled METHOD AND APPARATUS FOR INTERPOLATING BETWEEN DATA SAMPLES. The preferred embodiment of the first embodiment uses linear interpolation. Using linear interpolation, the two sample times which are nearest to the desired resample time are located and interpolated using the following equation, where Ij is the resampled value and $A_n$ and $A_{n+1}$ are the nearest samples in the time record, and Tx is the time of the sample x:

$$Ij = An + \frac{A_{n+1} - A_n}{T_{An+1} - T_{An}} (S_T - T_{An})$$

Step 540 repeats the interpolation process at the same time $S_t$ for the Q time record 441, generating the Q resampled time record 441.

The process will now be repeated for at the next $S_t$. The next resample time is a function of the modulation scheme. For non-staggered M-ary PSK and QAM, the next time $S_t$ is given by the formula:

$$S_T = S_T + T$$

For staggered M-ary PSK modulated signals, the next time $S_t$ is given by the formula:

$$S_T = S_T + \frac{T}{2}$$

In Step 560, this interpolating process is repeated until the end of the time record 410 (or 420) is reached. In Step 570, the initial sample start time for the next resample pass is calculated using $D_t = D_t + dt$. In step 580, resampling continues until k resample time records 431 and 441 have be generated. Each resampled record 431 or 441 is passed along with its initial sample start time, $D_t$, to the magnitude generator 450.

Figure 6:
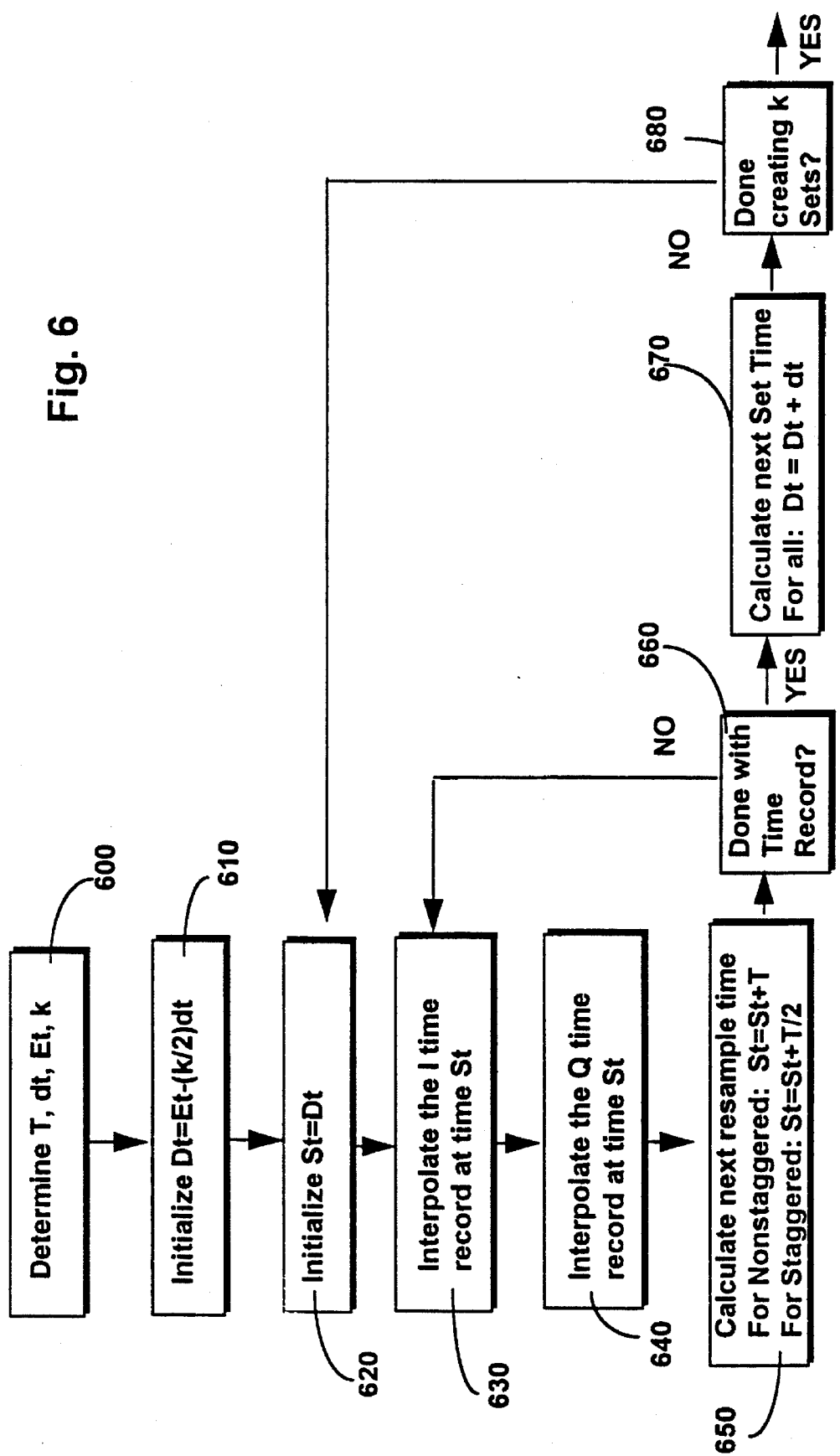
FIG. 6 is a flow chart of the method used in the second embodiment of the resampler of FIG. 4 in accordance with the present invention.

FIG. 6 is a flow chart of the method used in the second embodiment of the resampler in accordance with the present invention. Since an estimate of the phase is known, the strategy used in the second embodiment is to search for the 0° phase in the vicinity of the estimated phase by spacing the initial sample start times in close proximity to the estimated phase. In step 600, the values for T and dt are determined. The resample period, T, is defined as $T=1/f_s$, where $f_s$ is the known symbol rate. The required resolution for the clock phase and the vicinity to be searched are used to determine the variable dt. Generally, for a desired resolution R (in radians) and search vicinity G (in radians), the number of resampled time records, k, is given the equation $k=G/R$. Then dt is given by the equation $dt=GT/2\pi k$. G must be less than the symbol phase ambiguity for the modulation scheme.

The second embodiment of the resampler generates k resample records 431 (or 432) for each time record 410 (or 420). Each resample record 431 (or 432) will have one sample per symbol in the time record (410 or 420).

In step 610, the variable $D_t$ is initialized to $Et-(k/2)dt$, where Et is the estimate of the 0° phase of the symbol clock, and k is the number of resample records 431 and 441 to be generated. Variable $D_t$ is the initial sample start time which is uniquely calculated for each resample time record generated in the set. It is also used to determine when resampling has been completed. The variable $S_t$, is the resample time for each sample. In step 620, it is then initialized to $D_t$, the first resample time for this time record.

In step 630, the I time record is interpolated at time=$S_t$. The same interpolation techniques used in steps 530 and 540 above may be used. Step 640 repeats the interpolation process at the same time, St, for the Q time record 441, generating the Q resampled time record 441.

The process will now be repeated for at the next $S_t$. The next time is a function of the modulation scheme. For non-staggered M-ary PSK and QAM, the next time $S_t$ is given by the formula:

$$S_t = S_t + T$$

For staggered M-ary PSK modulated signals, the next time $S_t$ is given by the formula:

$$S_T = S_T + \frac{T}{2}$$

In Step 660, this interpolating process is repeated until the end of the time record 410 (or 420) is reached. In Step 670, the initial sample start time for the next resample pass is calculated using $D_t = D_t + dt$. In step 680, resampling continues until k resample time records 431 and 441 have been generated. Each resampled record 431 or 441 is passed along with its initial sample start time, $D_t$ to the magnitude generator 450.

Next, each of the resampled time records 431 and 441 are fed through magger 450. The magger 450 generated a magnitude time record 451 from each set of I resampled time record 431 and the Q resampled time record 441. Each magnitude time record 451 along with its $D_t$ is passed to the statistical analyzer 460.

Figure 7:
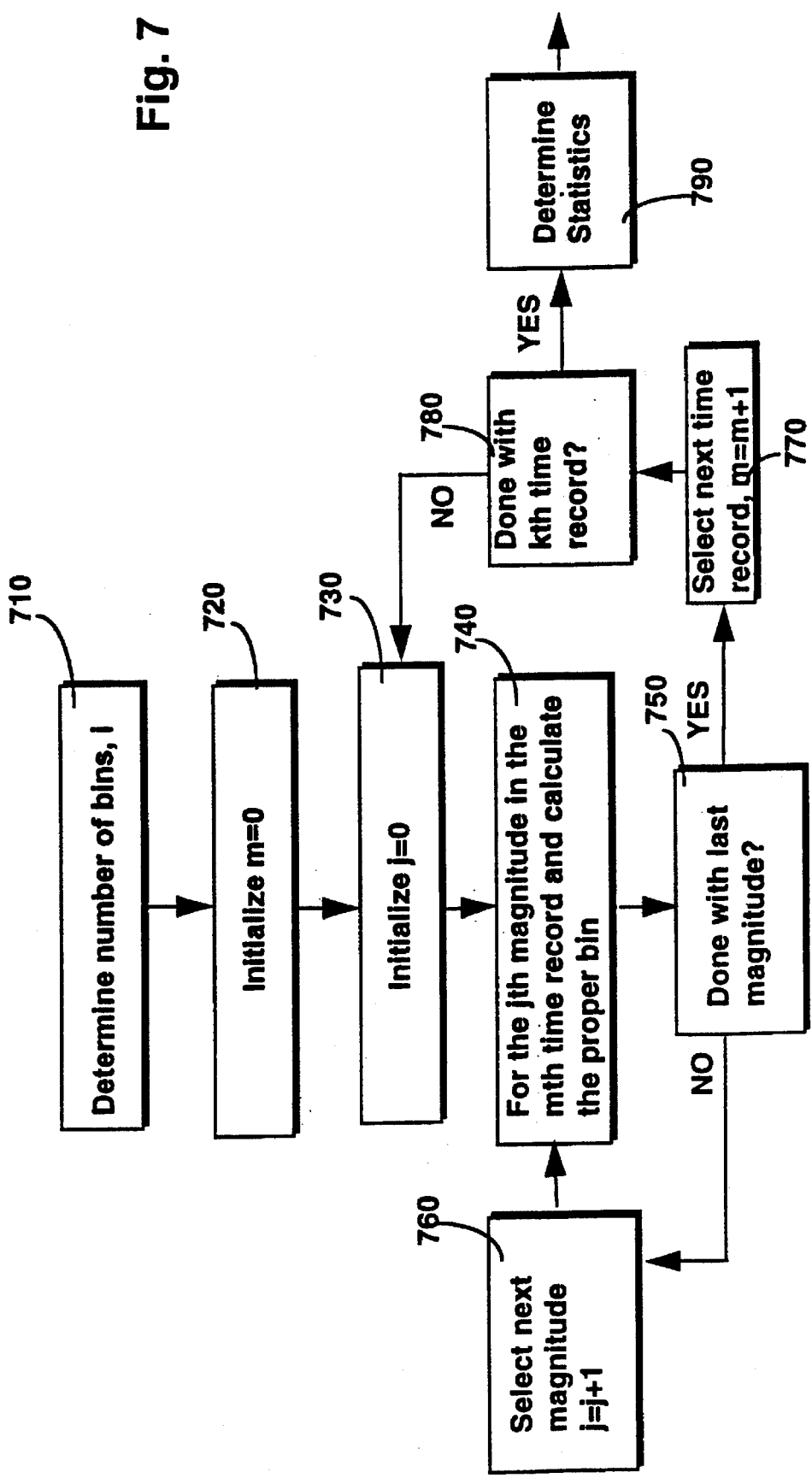
FIG. 7 is a flow chart of the method used in the statistical analyzer of FIG. 4 in accordance with the present invention.

FIG. 7 is a flow chart of the method used in the preferred embodiment of the statistical analyzer 460. The method shown in FIG. 7 is repeated for each of the k magnitude time records to generate k statistical property records 461. First, a histogram is generated for the each magnitude time record in the set. Then, the histogram of each magnitude time record is analyzed for certain statistical features. The histogram and properties for each magnitude time record, referred to as a statistical property records, are supplied as a set to the evaluator 470.

Step 710 determines the number, i, and size of bins to use in the analysis. The number of bins used to generate the histogram in the preferred embodiment of the present invention is a function of the modulation scheme. For staggered M-ary PSK modulation scheme, 60 bins are used. For non-staggered M-ary PSK modulation and M-ary QAM modulation schemes, 100 bins are used. Given the number of bins, the size of each bin is determined next. Since in the preferred embodiment the samples are generally normalized to a maximum magnitude of 1.2, bins of uniform size are created for magnitudes from 0.1 to 1.2. Magnitudes less that 0.1 may be discarded, if desired. For example, if 100 bins are used, bin 1 is used to count samples with magnitudes from 0.1 to 0.112. Step 720 initializes the counter for m for the outer loop. The statistical operation will be performed on each of the k magnitude time records. Step 730 initializes the variable j to 0, j is used to count the number of magnitudes in each of the magnitude time records which have been analyzed. Step 740 selects the proper bin from the i number of bins for the jth sample in the mth time record. The magnitude of each sample is used to determine in which bin, using the bins minimum and maximum value determined above, the sample is to be counted. Step 750 repeats the classification process for the next sample until the last sample in the time record has been processed. Step 760 increments the counter j used to track the number of samples classified. If the last sample in the mth magnitude time record has been processes, then counter m is incremented in Step 770 and if kth magnitude time record has not been processed, the process is repeated for the new mth time record beginning at Step 730.

After the final magnitude record has been processed, Step 790 is performed for each statistical analysis record. In the preferred embodiment of the present invention, another statistical operation is performed in Step 790. The operation is also a function of the modulation scheme. For non-staggered M-ary PSK modulation schemes, the operation determines the peak value of the histogram (probability density function). The operation for staggered M-ary PSK and M-ary QAM is described in detail below. The statistical properties resulting from the operations and the $D_t$ from the magnitude time record are passed as a set of statistical property records 461 to the evaluator 470.

In an alternate embodiment of the statistical analyzer, the statistical operation(s) performed in Step 790 could be performed directly on the magnitude time records, rather than generating a histogram and then calculating its statistics as done in the preferred embodiment.

The evaluator 470 receives the statistical property records 461 representing each of the magnitude time records 451. The evaluator 470 compares each of the statistical analysis records and selects the statistical time record which most closely matches the theoretical probability density function. In the preferred embodiment, the selection criteria used in the evaluator is a function of the modulation scheme. In the preferred embodiment of the present invention, the evaluator selects the statistical property record with the largest the statistical property calculated in step 790. For non-staggered M-ary PSK and QAM modulation schemes, that statistical property is the peak of the histogram. For staggered M-ary PSK modulation schemes, that statistical property is the peak of the histogram divided by the statistical variance of the histogram. In the preferred embodiment, the $D_t$ of the selected statistical property record is supplied to the measurement analyzer 340 and carrier synchronizer 330 as the relative system time for 0° of the symbol clock.

In a second embodiment, the selected statistical property of the selected statistical property record (having initial sample time, D) is compared to the same statistical property of the statistical property records which immediately precedes (D-dt) and immediately follows (D+dt). If the statistical property is sufficiently greater that the other records, then that time is passed to the measurement analyzer 340 and carrier synchronizer 330 as the relative system time for 0° of the symbol clock. In the event that the statistical property is not greater, the evaluator may choose to pass the earlier or later value as the relative system time for 0° of the symbol clock, or cause the system to resample again using the either value of $D_t$ or a midpoint between the two values of $D_t$ as the estimated phase Et.

FIGS. 8A and 8B are plots of the histogram of a typical narrow bandwidth Nyquist filtered magnitude time record of OQPSK. FIG. 8A represents the histogram of the signal at a time other than 0° of the symbol clock while FIG. 8B represents the histogram of the signal at 0° of the symbol clock.

Figure 9A:
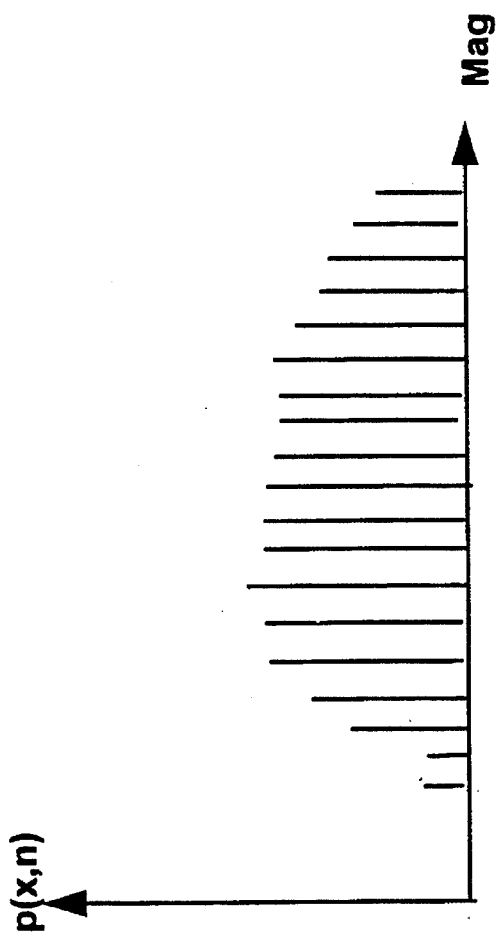
FIG. 9A and 9B are plots of the histogram of a partially ISI filtered magnitude time records from a CDMA-type communication system.
Figure 9B:
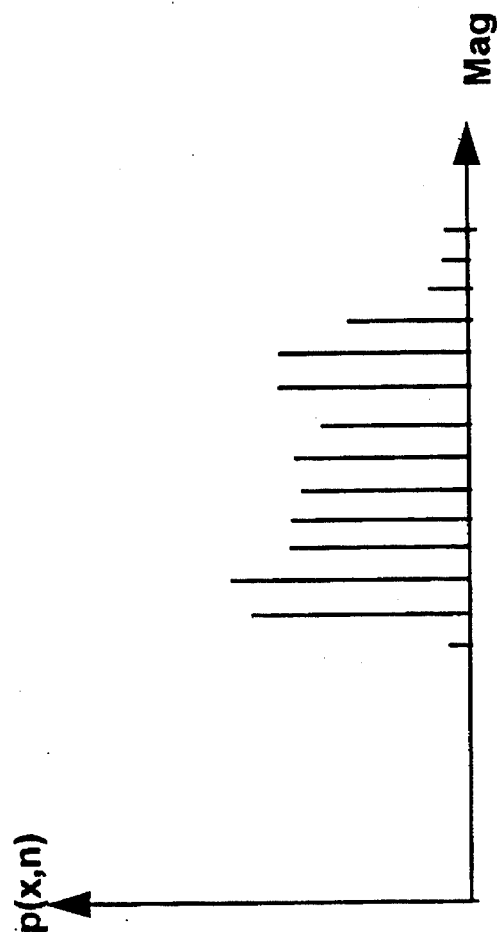

FIG. 9A and 9B are plots of the histogram of a partially ISI filtered magnitude time record of OQPSK modulation from a CDMA-type communication system. FIG. 9A represents the histogram of the signal at a time other than 0° of the symbol clock while FIG. 9B represents the histogram of the signal at 0° of the symbol clock.

For the staggered M-ary PSK modulated signals, the statistical property used by the evaluator 470 is the peak value of the histogram (probability density function) divided by its variance. This property provides identification of the histogram shown in FIG. 8B and FIG. 9B which are the histograms of the signal at 0° of the symbol clock.

FIGS. 10A and 10B are plots of the histograms of a typical Nyquist filtered 16 QAM magnitude time record. FIG. 10A represents the histogram of the signal at a time other than 0° of the symbol clock while FIG. 10B represents the histogram of the signal at 0° of the symbol clock.

For M-ary QAM signals, the operations employed in the statistical analyzer 460 have the same objective as the methods described above, but the operations are more complex because the histogram contains multiple impulses. For example in 16 QAM, there are three impulses. In the preferred embodiment for 16 QAM, the magger which normalizes the data to approximately 1. This results with peaks at approximate 1, 0.85 and 0.33. The statistical analyzer then generates a histogram of 100 bins over a normalized range of 0.1 to 1.2. The statistical analyzer then slices each histogram into three histograms with a different impulse in each histogram and calculates the peak value and variance of each histogram. These values are then averaged to produce the statistical property used by the evaluator 470. For the M-ary QAM modulated signals, the peak value of the histogram will provide identification of the histogram shown in FIG. 10B which is the density function at approximately 0° of the symbol clock.

Figure 11:
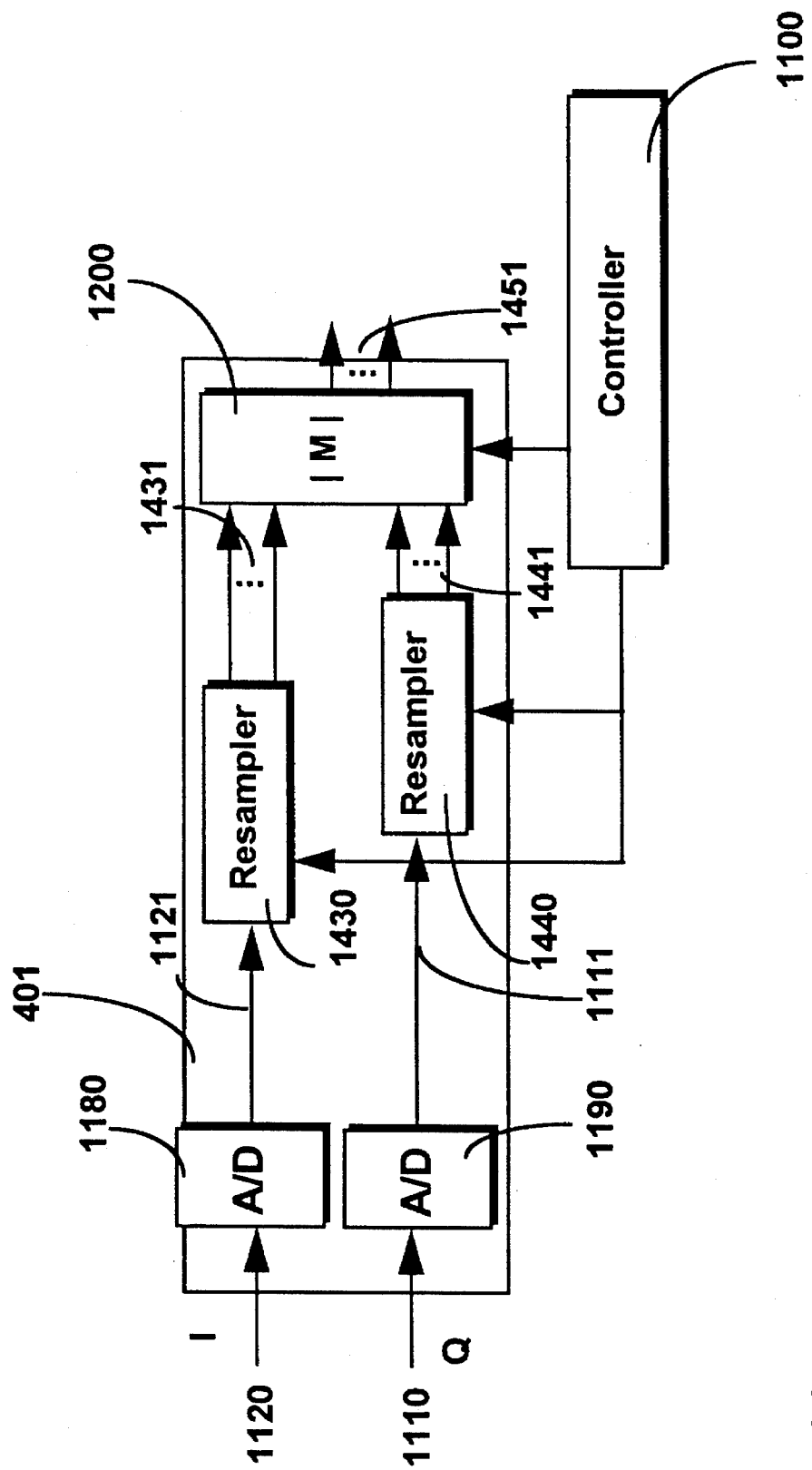
FIG. 11 is a conceptual block diagram of an alternate embodiment of resampler 400 of FIG. 4 in accordance with the present invention.

FIG. 11 is a conceptual block diagram of resampler 401 an alternate embodiment of resampler 400 of FIG. 4 in accordance with the present invention. Resampler 401 comprises two analog-to-digital converters 1180 and 1190, two resamplers 1430 and 1440 and magger 1200. The resamplers and magger are under the control of controller 1100. This embodiment of the resampler directly accepts baseband data which has been transformed elsewhere in the communications system. The converters 1180 and 1190 are typically fixed rate converters. They generate time records 1121 and 1111. The resamplers 1430 and 1440 operate as described above to generate a set of resampled I time records and resampled Q time records, respectively. These time records are then fed through magger 1200 to generate a set of magnitude time records 1451. These magnitude time records may be processed as described above.

I claim:

1. An apparatus for determining the phase of a symbol clock of a modulated signal having a predetermined symbol period, the apparatus comprising:

sampler with an input connected to the modulated signal and an output, the sampler having a fixed predetermined sample period;

repetitive resampler with an input connected to the sampler and an output, the resampler having a predetermined resample period;

statistical analyzer with an input connected to the output of the resampler and an output;

evaluator with an input connected to the output of the statistical analyzer and an output, the output indicating the phase of the symbol clock.

2. An apparatus as in claim 1, wherein the repetitive resampler further comprises:

transformer having an input connected to the output of the sampler and an I component output and a Q component output;

first subresampler having an input connected to the I component output of the transformer and an output, said resampler having said predetermined resample period;

second subresampler having an input connected to the Q component output of the transformer and an output, said resampler having said predetermined resample period; and magger connected to the output of the first subresampler and second subresampler and having an output.

3. Apparatus as in claim 1 wherein the statistical analyzer comprises a histogram generator.

4. Apparatus as in claim 3 wherein the statistical analyzer further comprises a statistical property generator connected between the histogram generator and the output of the statistical analyzer.

5. Apparatus as in claim 1 wherein the resample period is the period of the symbol rate.

6. Apparatus as in claim 1 wherein the resample period is one-half the period of the symbol rate.

7. An apparatus for determining the phase of a symbol clock of a modulated signal having a predetermined symbol period, the apparatus comprising:

sampler with an input connected to the modulated signal and an output, the sampler having a fixed predetermined sample period;

resampling means, with an input connected to the sampler and an output, for repetitively resampling the output of the sampler beginning at a plurality of predetermined start times and having a predetermined resample period, wherein a plurality of resample time records is generated, each having its respective start time;

statistical analysis means with an input connected to the output of the resampling means and an output, for performing a predetermined statistical operation on each of the plurality of resample time records, wherein a plurality of statistical property records is generated, each having its respective start time;

evaluation means connected to the output of the statistical analysis means for selecting a statistical property record based on a predetermined selection criteria, wherein the start time of the respective statistical property record indicates the phase of the symbol clock.

8. An apparatus as in claim 7, wherein the resampling means further comprises:

transformer having an input connected to the output of the sampler and an I component output and a Q component output;

first subsampling means, with an input connected to the I component output and an output, for repetitively resampling the I component output beginning at said plurality of predetermined start times and having said predetermined resample period, wherein a plurality of I component resample time records are generated each having its respective start time;

second subsampling means, with an input connected to the Q component output and an output, for repetitively resampling the Q component output beginning at said plurality of predetermined start times and having said predetermined resample period, wherein a plurality of Q component resample time records are generated each having its respective start time; and magger connected to the output of the first subresampling means and second subresampling means and having an output, wherein a plurality of resample time records is generated each having its respective start time.

9. Apparatus as in claim 7 wherein the statistical operation performed by the statistical analysis means generates a probability density function for each of the plurality of resample time records.

10. Apparatus as in claim 9 wherein the statistical analysis means further comprises a statistical property generation means for determining a predetermined property of the probability density function for each of a plurality of resample time records.

11. Apparatus as in claim 10 wherein the selection criteria used by the evaluation means to select the statistical property record is the peak value of the predetermined property of the probability density function determined by the statistical property generation means.

12. Apparatus as in claim 7 wherein the predetermined resample period is one-half the symbol period.

13. Apparatus as in claim 7 wherein the predetermined resample period is the symbol period.

14. A method for determining the phase of a symbol clock for a modulated signal having a predetermined symbol period, the method comprising:

sampling the modulated signal at a fixed predetermined sample rate;

repetitively resampling the sampled signal beginning at a plurality of predetermined start times and having a predetermined resample period, whereby a plurality of resample time records is generated each having its respective start time;

performing a first statistical operation on the plurality resample time records to generate statistical information about each resample time record, whereby a plurality of statistical property records is generated, each having its respective start time;

evaluating the plurality of statistical property records to select a statistical property record based on a predetermined selection criteria, wherein the start time of the respective statistical property record indicates the phase of the symbol clock.

15. Method as in claim 14, where in the step of repetitively resampling further comprises:

transforming the sampled signal into an I component and a Q component;

subresampling the I component at said plurality of predetermined start times and having said predetermined resample period, wherein a plurality of I component resample time records are generated each having its respective start time;

subresampling the Q component at said plurality of predetermined start times and having said predetermined resample period, wherein a plurality of Q component resample time records are generated each having its respective start time; and calculating the magnitude of the I component resample time records and Q component time records to generate a plurality of resample time records, each having its respective start time.

16. Method as in claim 14 wherein the statistical information generated by the step of performing a first statistical operation is a probability density function for each of the plurality of resample time records.

17. Method as in claim 16 further comprising the step of performing a second statistical operation on the statistical information generated by the step of performing a first statistical operation.

18. Method as in claim 17 wherein the selection criteria used in the step of evaluating the plurality of statistical property records is based on the peak value generated by performing the second statistical operation.

19. Method as in claim 14 wherein the predetermined resample period is one-half the symbol period.

20. Method as in claim 14 wherein the predetermined resample period is the symbol period.

* * * * *